United States Patent
Tamakoshi et al.

(10) Patent No.: US 12,523,672 B2
(45) Date of Patent: Jan. 13, 2026

(54) TRANSPORT APPARATUS

(71) Applicant: HITACHI HIGH-TECH CORPORATION, Tokyo (JP)

(72) Inventors: Takeshi Tamakoshi, Tokyo (JP); Satoru Kaneko, Tokyo (JP); Yasuaki Aoyama, Tokyo (JP); Hiroyuki Kobayashi, Tokyo (JP); Ryosuke Hoshi, Tokyo (JP); Hiroshi Watanabe, Tokyo (JP); Katsuhiro Kambara, Tokyo (JP); Kuniaki Onizawa, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 1047 days.

(21) Appl. No.: 17/616,355

(22) PCT Filed: Apr. 14, 2020

(86) PCT No.: PCT/JP2020/016424
§ 371 (c)(1),
(2) Date: Dec. 3, 2021

(87) PCT Pub. No.: WO2021/002080
PCT Pub. Date: Jan. 7, 2021

(65) Prior Publication Data
US 2022/0252628 A1 Aug. 11, 2022

(30) Foreign Application Priority Data
Jul. 2, 2019 (JP) ................................. 2019-123605

(51) Int. Cl.
*B65G 54/02* (2006.01)
*G01N 35/04* (2006.01)
(Continued)

(52) U.S. Cl.
CPC ............. *G01N 35/04* (2013.01); *B65G 54/02* (2013.01); *H02K 11/215* (2016.01);
(Continued)

(58) Field of Classification Search
CPC ........... G01N 35/04; G01N 2035/0477; H02K 11/215; H02K 41/031; H02K 2201/18; H02P 25/064; B65G 54/02
See application file for complete search history.

(56) References Cited

U.S. PATENT DOCUMENTS

2009/0140686 A1 6/2009 Potze et al.
2014/0231217 A1 8/2014 Denninger et al.
(Continued)

FOREIGN PATENT DOCUMENTS

JP 57-135364 A 8/1982
JP 3210153 B2 9/2001
(Continued)

OTHER PUBLICATIONS

Extended European Search Report received in corresponding European Application No. 20828949.6 dated Jun. 16, 2023.
(Continued)

*Primary Examiner* — Jill A Warden
*Assistant Examiner* — Michael Stanley Gzybowski
(74) *Attorney, Agent, or Firm* — MATTINGLY & MALUR, PC

(57) ABSTRACT

A conveying device detects an abnormality due to a change in the surface state of the conveying plane. The conveying device has a conveying plane for conveying thereabove a conveying container equipped with a magnetic body, a position detection unit for detecting the position of the conveying container above the conveying plane, a magnetic pole disposed below the conveying plane and equipped with a core and a coil, a drive unit for applying a voltage to the magnetic pole, and a calculation unit for controlling the drive unit. The calculation unit calculates the conveying speed of the conveying container on the basis of the position of the conveying container above the conveying plane and the time at which the conveying container passes through the position, and detects the surface state of the conveying plane on the basis of the calculated conveying speed of the conveying container.

10 Claims, 11 Drawing Sheets

(51) Int. Cl.
*H02K 11/215* (2016.01)
*H02K 41/03* (2006.01)
*H02P 25/064* (2016.01)

(52) U.S. Cl.
CPC ......... *H02K 41/031* (2013.01); *H02P 25/064* (2016.02); *G01N 2035/0477* (2013.01); *H02K 2201/18* (2013.01)

(56) References Cited

U.S. PATENT DOCUMENTS

| 2017/0131309 | A1 | 5/2017 | Pedain |
| 2017/0184622 | A1 | 6/2017 | Sinz et al. |
| 2017/0309139 | A1 | 10/2017 | Hamik et al. |

FOREIGN PATENT DOCUMENTS

| JP | 2004-054838 A | 2/2004 |
| JP | 2008-521379 A | 6/2008 |
| JP | 2015-502525 A | 1/2015 |
| JP | 2016-166890 A | 9/2016 |

OTHER PUBLICATIONS

International Search Report of PCT/JP2020/016424 dated Jul. 14, 2020.

FIG. 7

| DATE | CURRENT VALUE | | | |
|---|---|---|---|---|
| | MAGNETIC POLE POSITION Xa | MAGNETIC POLE POSITION Xb | MAGNETIC POLE POSITION Xc | ... |
| (1) yyyy/mm/dd | 0.50A | 0.48A | 0.52A | ... |
| (2) yyyy/mm/dd | 0.51A | 0.49A | 0.49A | ... |
| (3) yyyy/mm/dd | 0.50A | 0.90A | 0.50A | ... |
| (4) yyyy/mm/dd | 0.49A | 0.91A | 0.51A | ... |
| ... | ... | ... | ... | ... | ns # TRANSPORT APPARATUS

TECHNICAL FIELD

The present invention relates to a transport apparatus used for a sample analysis system such as a sample analyzer performing analysis of a biological specimen such as blood, blood plasma, blood serum, urine, and other body fluid for example (will be hereinafter referred to as a "sample") and a sample pretreatment apparatus performing pretreatment required for the analysis.

BACKGROUND ART

In a sample analysis system for a clinical examination, examination of instructed analysis items is performed with respect to a sample such as blood, blood plasma, blood serum, urine, and other body fluid (sample).

In this sample analysis system, apparatuses having plural functions are connected, and processes of respective steps are performed automatically. That is to say, in order to rationalize the work of an examination room, an analysis unit (analysis step) performing plural analyses such as biochemistry and immunity, a pretreatment unit (pretreatment step) performing plural pretreatments required for the analysis, and so on are connected by a transport line and are used as one sample analysis system.

In recent years, due to sophistication of healthcare and aging of patients, sample analysis is becoming more important. Therefore, in order to improve analysis processing performance of the sample analysis system, there are requirements of high speed transportation, mass transportation, simultaneous transportation, and transportation in plural directions of a sample.

As a background art of the present technical field described above, there is Japanese Unexamined Patent Application Publication No. 2016-166890 (Patent Literature 1).

In Patent Literature 1, there is described a laboratory sample distribution system that is highly flexible and offers a high transport performance. Also, in Patent Literature 1, there is described that a laboratory sample distribution system comprises; a number of container carriers, the container carriers each comprising at least one magnetically active device, preferably at least one permanent magnet, and being adapted to carry a sample container containing a sample; a transport device; and a control device, the transport device comprises; a transport plane being adapted to carry the multiple container carriers; a number of electromagnetic actuators being stationary arranged below the transport plane, the electro-magnetic actuators being adapted to move a container carrier placed on top of the transport plane by applying a magnetic force to the container carrier; and the control device is adapted to drive the electro-magnetic actuators and to control the movement of the container carriers such that more than three container carriers are movable simultaneously and independently from one another (refer to Abstract).

Further, in Patent Literature 1, there is described that by comparing the scheduled position and the sensed position, it is further possible to detect a gradual reduction of the transport speed, for example, caused by contamination of the transport plane resulting in an increased friction force, if such a gradual reduction of the transport speed is detected, the control device may accordingly increase the magnetic force generated by the electro-magnetic actuators and/or display an error message if the transport speed is below a given threshold (refer to [0021].

CITATION LIST

Patent Literature

Patent Literature 1: Japanese Unexamined Patent Application Publication No. 2016-166890

SUMMARY OF INVENTION

Technical Problem

As described above, in Patent Literature 1, there is described that, by comparing the scheduled position and the sensed position of the container carrier, reduction of the transport speed caused by contamination of the transport plane is detected.

However, according to a laboratory sample distribution system described in Patent Literature 1, until the scheduled position and the sensed position of the container carrier (transport container) become different, it is hard to detect reduction of the transport speed caused by contamination of the transport plane.

Also, in Patent Literature 1, there is no description that the transport speed of the container carrier (transport container) changes and the transport performance changes when the mass of the container carrier (transport container) changes by the kind, the volume (including presence and absence), and so on of the sample, when the thrust of the container carrier (transport container) lowers by reduction of the magnetic force of the permanent magnet, and so on, namely by change of the state of the container carrier (transport container).

Therefore, the present invention provides a transport apparatus that detects an abnormality thereof due to a change in a surface state of a transport plane of the transport apparatus and maintains high transport performance.

Solution to Problem

In order to solve the problem described above, a transport apparatus of the present invention has: a transport plane on which a transport container including a magnetic body is transported; a position detector that detects a position of the transport container on the transport plane; a magnetic pole that is arranged under the transport plane and includes a core and a coil; a drive unit that applies a voltage to the magnetic pole; and a calculation unit that controls the drive unit, in which the calculation unit calculates transport speed of the transport container based on a position of the transport container on the transport plane and a time at which the transport container passes through the position and using an interval of time required between magnetic poles in an acceleration region where the transport container accelerates and a distance between the magnetic poles, the calculation unit compares calculated transport speed of the transport container and a reference transport speed of the transport container, and the calculation unit detects a surface state of the transport plane.

Advantageous Effects of Invention

According to the present invention, it is possible to provide a transport apparatus that detects an abnormality thereof due to a change in a surface state of a transport plane of the transport apparatus and maintains high transport performance.

Also, problems, configurations, and effects other than those described above will be clarified by explanation of embodiments described below.

BRIEF DESCRIPTION OF DRAWINGS

FIG. 7 is an explanatory table showing, in time series, a current value for each position of a magnetic pole in a transport apparatus 1 described in Third Embodiment.

DESCRIPTION OF EMBODIMENTS

Embodiments of the present invention will be hereinafter explained using the drawings. Also, a substantially same or similar configuration will be marked with a same reference sign, and explanation thereof may be omitted when the explanation is duplicated.

First Embodiment

First, a schematic configuration of a transport apparatus 1 described in First Embodiment will be explained.

Figure 1:
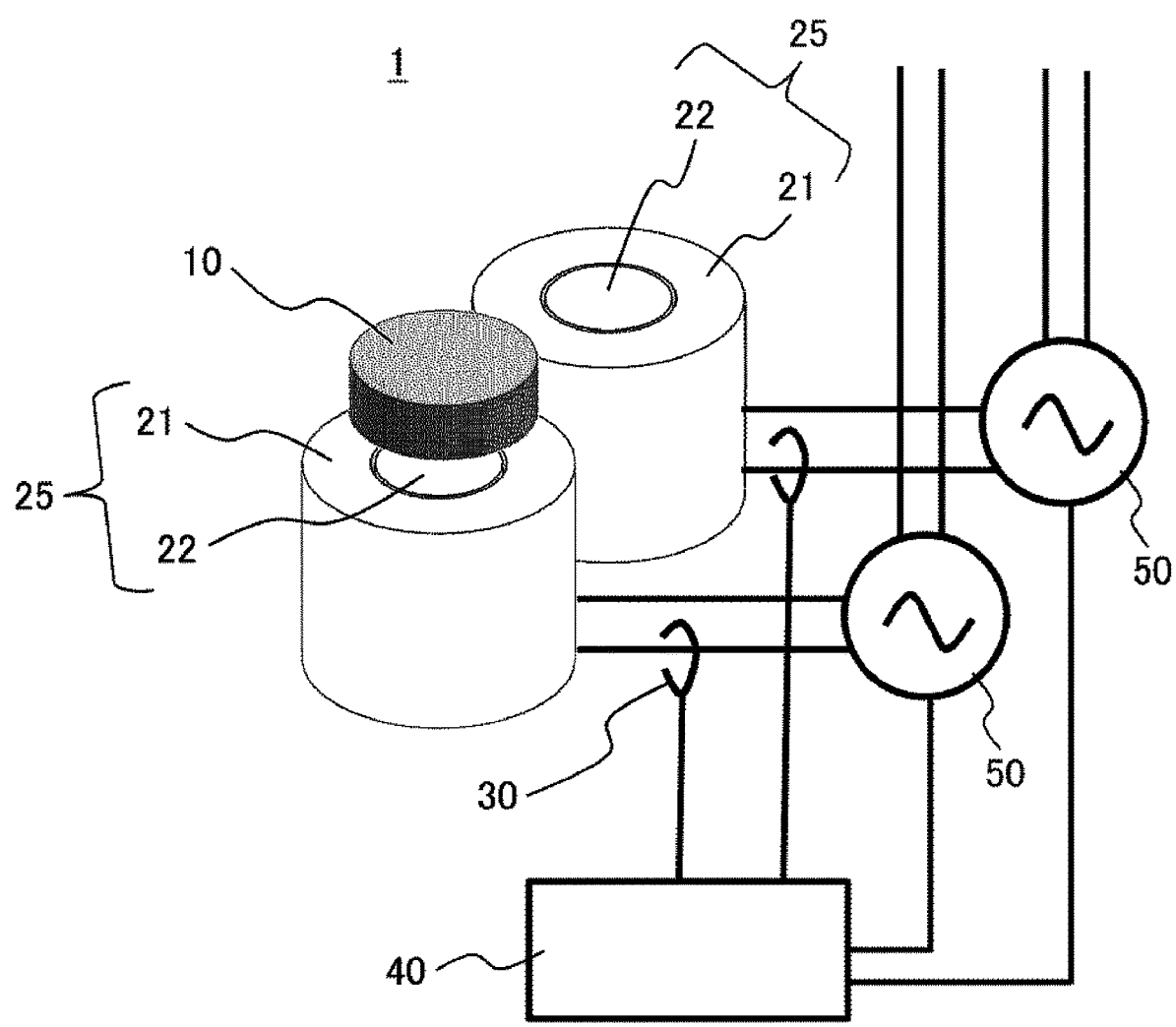
FIG. 1 is an explanatory view illustrating a schematic configuration of a transport apparatus 1 described in First Embodiment.

FIG. 1 is an explanatory view illustrating a schematic configuration of a transport apparatus 1 described in First Embodiment.

The transport apparatus 1 described in First Embodiment includes a transport plane (not illustrated) on which a transport container (not illustrated) including a permanent magnet (magnetic body) 10 is transported, a position detector 30 that detects a position of the transport container including the permanent magnet 10 on the transport plane, a magnetic pole 25 that is arranged under the transport plane and includes a core 22 that is a magnetic body and a coil 21 that is wiring wound around the outer circumferential side of the core 22, a drive unit (a drive apparatus driving the transport container) 50 that applies a voltage to the coil 21 of the magnetic pole 25, and a calculation unit (a control apparatus controlling the drive apparatus) 40 that controls the drive unit 50.

Also, the magnetic pole 25 and the permanent magnet 10 are arranged to oppose with each other through the transport plane. The permanent magnet 10 relatively moves above the magnetic pole 25. That is to say, the permanent magnet 10 moves above the magnetic pole 25 through the transport plane. As described above, the transport plane is arranged between the magnetic pole 25 and the permanent magnet 10, and the permanent magnet 10 slidingly moves above the transport plane.

The permanent magnet 10 is arranged in the transport container. A permanent magnet 10 of neodymium, ferrite, and the like for example is used for the permanent magnet 10. Further, although explanation is made using the permanent magnet 10 in First Embodiment, other magnets and a soft magnetic body may be used instead of the permanent magnet 10. Also, instead of the permanent magnet 10, it is also possible to use a combination of the permanent magnet 10 and a soft magnetic body.

Also, "magnetic body" is to mean the permanent magnet 10, other magnets and soft magnetic bodies, or a combination of the permanent magnet 10 and a soft magnetic body, and so on. In First Embodiment, explanation will be made representatively using the permanent magnet 10.

The permanent magnet 10 is arranged in a transport container such as a container carrier. Also, the transport container is a sample holder (not illustrated), a sample rack (not illustrated) holding plural number of piece of the sample holders, and so on.

Normally, one piece of the sample container storing a sample is arranged in the transport container. Also, accompanying movement of the permanent magnet 10, the transport container is transported to a desired position. That is to say, the transport container includes the permanent magnet 10 and the sample container, and is transported on the transport plane.

By applying a voltage to the coil 21 of the magnetic pole 25, the transport apparatus 1 allows the core 22 to generate an electro-magnetic force, and allows the permanent magnet 10 arranged in the transport container to move between the plural magnetic poles 25 (between the magnetic pole 25 and the magnetic pole 25). In order to apply an electro-magnetic force to the permanent magnet 10 efficiently and in order to move the permanent magnet 10 to a target direction, relative positional information of the permanent magnet 10 and the magnetic pole 25 is required.

For example, such a case that the permanent magnet 10 is located above (right above) one of the two magnetic poles 25 is assumed. Even when a voltage is applied to the magnetic pole 25 (the coil 21), the permanent magnet 10 being located right below the magnetic pole 25 (the coil 21), a force (thrust) in the transport direction is not generated in the permanent magnet 10. On the other hand, when a voltage is applied to the magnetic pole 25 (the coil 21), the permanent magnet 10 not being located above (right above) the magnetic pole 25 (the coil 21), in the permanent magnet 10, a force of being drawn to the magnetic pole 25 is generated, and a force (thrust) in the transport direction is generated.

That is to say, by applying a voltage to the desired magnetic pole 25 (the coil 21), a force in the transport direction can be generated efficiently in the permanent magnet 10. Also, by selecting the magnetic pole 25 (the coil 21) to which a voltage is applied, the orientation (direction) of a force to the transport direction can be controlled.

Also, the position detector 30 detects the position on the transport plane of a transport container including the permanent magnet 10. With respect to detection of the position of the permanent magnet 10, any method is applicable as far as the position of the permanent magnet 10 can be acquired such as detection of magnetism by a Hall element, detection using a physical position sensor, detection using an image for example. That is to say, the position detector 30 detects above which magnetic pole 25 (transport plane) the permanent magnet 10 is positioned.

Also, the drive unit 50 applies a voltage to the magnetic pole 25 (the coil 21).

Further, the calculation unit 40 controls the drive unit 50. A voltage applied to the magnetic pole 25 (the coil 21) is calculated by the calculation unit 40.

That is to say, based on a position of a certain magnetic pole 25A located in the transport direction of the transport container (the permanent magnet 10) and detected by the position detector 30 and a time of the position (a time of passing through or reaching the position) and a position of a next magnetic pole 25B (not necessarily be required to be an adjacent magnetic pole 25) detected by the position detector 30 and a time of the position (a time of passing through or reaching the position), the calculation unit 40 calculates a time (transport time) required for the permanent magnet 10 to move between a certain magnetic pole 25A and a next magnetic pole 25B and a distance between a certain magnetic pole 25A and a next magnetic pole 25B, and calculates the transport speed of the transport container based on the time and the distance calculated.

Also, based on the transport speed of the transport container calculated, the calculation unit 40 calculates a voltage to be applied to a magnetic pole 25C (not necessarily be required to be an adjacent magnetic pole 25) next to the next magnetic pole 25B located in the transport direction of the transport container (the permanent magnet 10) and detected by the position detector 30. Based on the voltage calculated by the calculation unit 40, the drive unit 50 applies the voltage to the magnetic pole 25C.

Thus, based on the voltage applied to the magnetic pole 25 (the coil 21) arranged under the transport plane, the transport container slidingly moves in sequence on the transport plane.

Also, according to the kind of the transport container (a rack, a holder, and the like for example) and the kind and the volume (including presence and absence) of a sample stored in the sample container and so on, the mass of the transport container changes. That is to say, even when the transport container is transported by a constant current, there is a case that a state of the transport container changes and the transport speed of the transport container changes.

Also, by drop of a magnetic force of the permanent magnet 10 (deterioration of the permanent magnet 10 such as demagnetization) and so on, a repulsion force of the permanent magnet 10 against the magnetic pole 25 drops, and the thrust of the transport container drops. That is to say, there is a case that a state of the transport container changes (deteriorates), and the transport speed of the transport container changes (drops) even when the transport container is transported by a constant current.

Also, by a change (deterioration) of a state of a transport surface of the transport container (a contact surface against the transport plane) and so on, a friction force between the transport plane and the transport surface of the transport container increases. That is to say, there is a case that a state of the transport container changes (deteriorates), and the transport speed of the transport container changes (drops) even when the transport container is transported by a predetermined current such as a constant current for example.

According to First Embodiment, transport speed of a transport container having a reference mass of a transport container (identical shape) with a magnetic force of a normal permanent magnet 10, in a state of a transport surface of a normal transport container, and in a surface state of a normal transport plane (reference transport speed of a transport container) is grasped beforehand, and the transport speed of the transport container grasped (reference transport speed of a transport container) and transport speed of a transport container calculated are compared. When difference of the transport speed does not fall into a predetermined range, it is detected that there is an abnormality in a transport apparatus (transport plane for example) 1 and a transport container.

Also, with respect to transport speed of a transport container calculated, there are two cases for example of (1) a case of using a reference transport container and moving the reference transport container on the transport plane for calculation, and (2) a case of using a transport plane having a reference surface state of a transport plane and moving a transport container to be inspected on the transport plane for calculation.

As described above, according to First Embodiment, based on a change (drop) of transport speed of a transport container, an abnormality of the transport apparatus 1 and the transport container caused by a change of a state of the transport apparatus 1 and the transport container is detected. That is to say, according to First Embodiment, based on transport speed of a transport container to be calculated, an abnormality of the transport apparatus 1, an abnormality of the transport apparatus 1 caused by a change of a state of the transport container, and an abnormality of the transport container are detected.

Also, a reference transport container is to have a predetermined shape and mass for example. It is particularly preferable to be a transport container in a new state. Also, a reference transport plane is to have a predetermined material and shape. It is particularly preferable to be a transport plane with less change (deterioration) of a surface state and in a new state. Reference transport speed of a transport container is to be grasped (measured) by a transport apparatus with a transport plane in a new state using such reference transport container.

Also, plural number of the reference transport speed of a transport container corresponding to masses of different plural transport containers may be grasped beforehand. That is to say, it is also possible to prepare a reference mass of a transport container by plural numbers and to prepare reference transport speed of a transport container corresponding to each mass.

Also, a change (deterioration) of a state of the transport apparatus 1 is deterioration of a surface state of the transport plane by contamination, deterioration and the like of the transport plane and so on for example. Further, a change (deterioration) of a state of a transport container is drop of a magnetic force of the permanent magnet 10 and contamination, deterioration and the like of a transport surface of a transport container for example. Also, a change of a state of a transport container is a change in a mass of a transport container and so on for example.

According to First Embodiment, such change in a state of the transport apparatus 1 and the transport container can be evaluated based on the transport speed of the transport container. Thus, the transport apparatus 1 described in First Embodiment detects an abnormality of the transport apparatus and the transport container caused by a change of a state of the transport apparatus and the transport container, and can provide a transport apparatus maintaining high transport performance.

Next, a schematic configuration of the magnetic pole 25 of the transport apparatus 1 described in First Embodiment will be explained.

Figure 2:
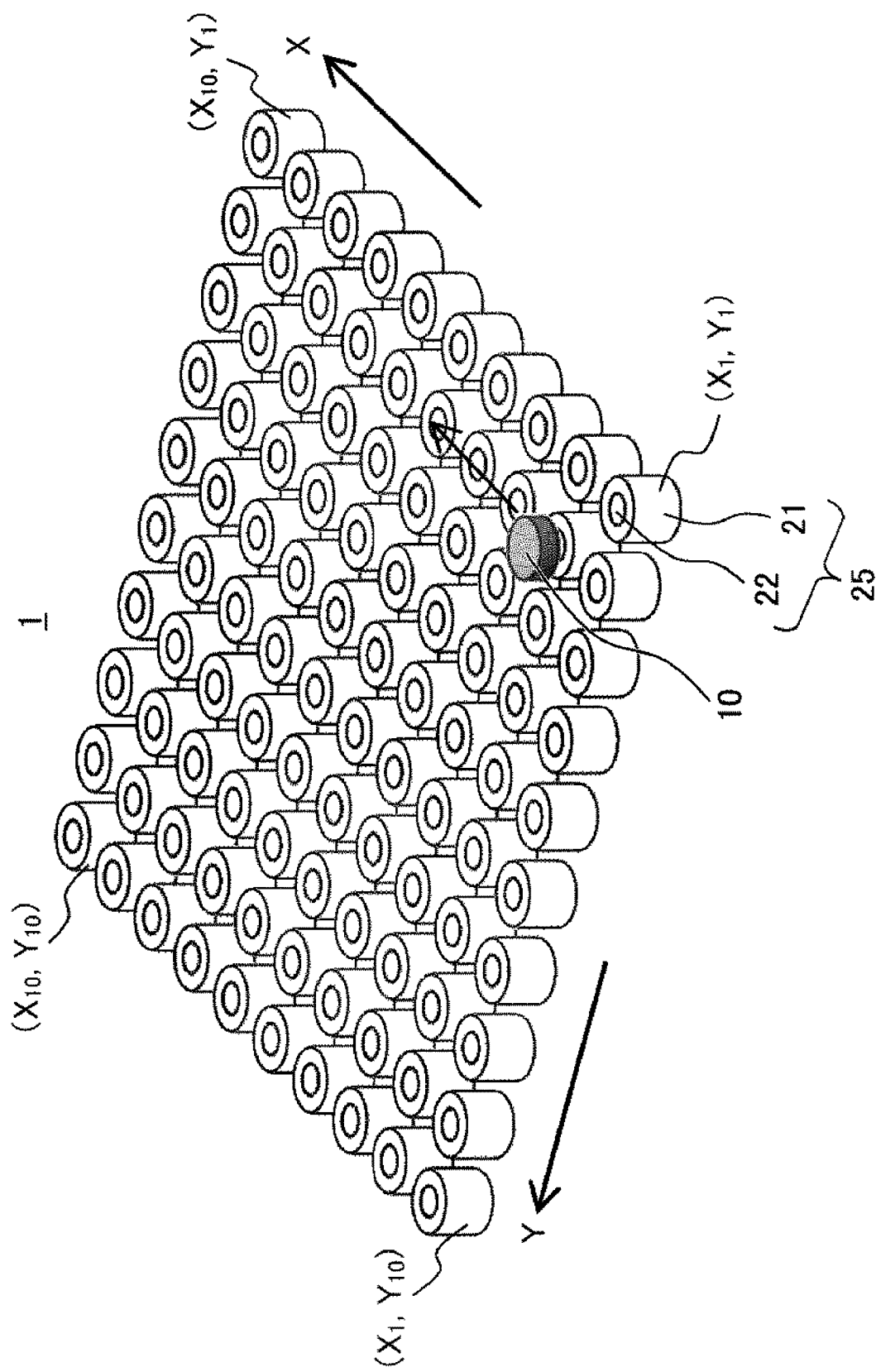
FIG. 2 is an explanatory view illustrating a schematic configuration of a magnetic pole 25 of the transport apparatus 1 described in First Embodiment.

FIG. 2 is an explanatory view illustrating a schematic configuration of the magnetic pole 25 of the transport apparatus 1 described in First Embodiment.

The transport apparatus 1 described in First Embodiment includes 10 pieces in X-direction, 10 pieces in Y-direction, and 100 pieces in total of the magnetic pole 25 for example. By magnetizing the magnetic pole 25 (by applying a voltage to the magnetic pole 25 (the coil 21)) based on a target transport route, the transport apparatus 1 described in First Embodiment can transport the transport container including the permanent magnet 10 in an optional target direction (transport direction).

The transport apparatus 1 described in First Embodiment includes the magnetic poles 25 of 100 pieces in total of X1Y1 to X10Y1 in X-direction and X1Y1 to X1Y10 in Y-direction for example. When the permanent magnet 10 is to be moved from X2Y2 to X5Y2, the drive unit 50 magnetizes a magnetic pole of X3Y2, a magnetic pole of X4Y2, and a magnetic pole of X5Y2 in sequence. Thus, the magnetic pole 25 slidingly moves in sequence on the transport plane from X2Y2 to X5Y2.

Next, in the transport apparatus 1 described in First Embodiment, a relationship between a time and a position of the transport container and a relationship between a time and transport speed of the transport container will be schematically explained by a graph when the transport container is transported by a predetermined current such as a constant current for example.

Figure 3:
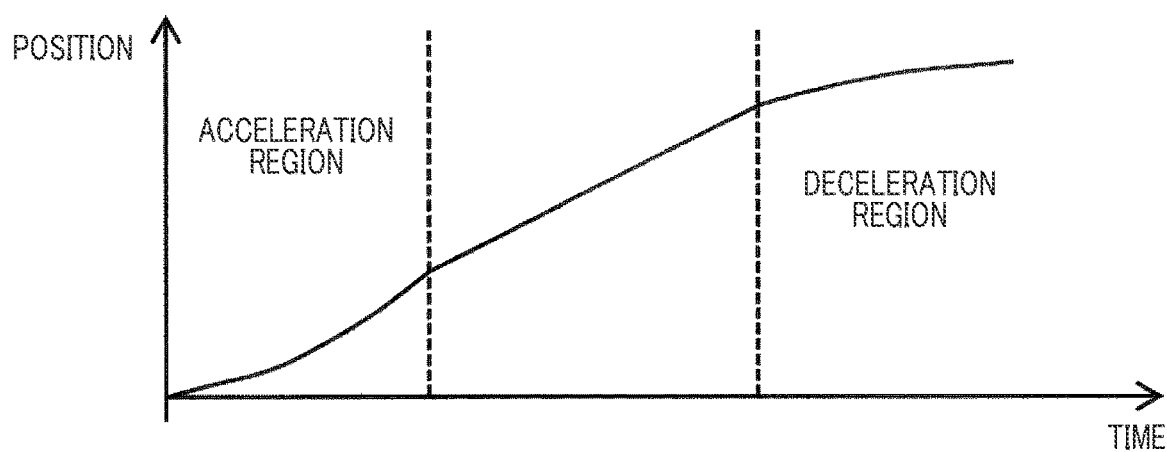
FIG. 3 is an explanatory graph schematically showing, when a transport container is transported by a constant current in the transport apparatus 1 described in First Embodiment, a relationship between a time and a position of the transport container and a relationship between a time and transport speed of the transport container.
Figure 3:
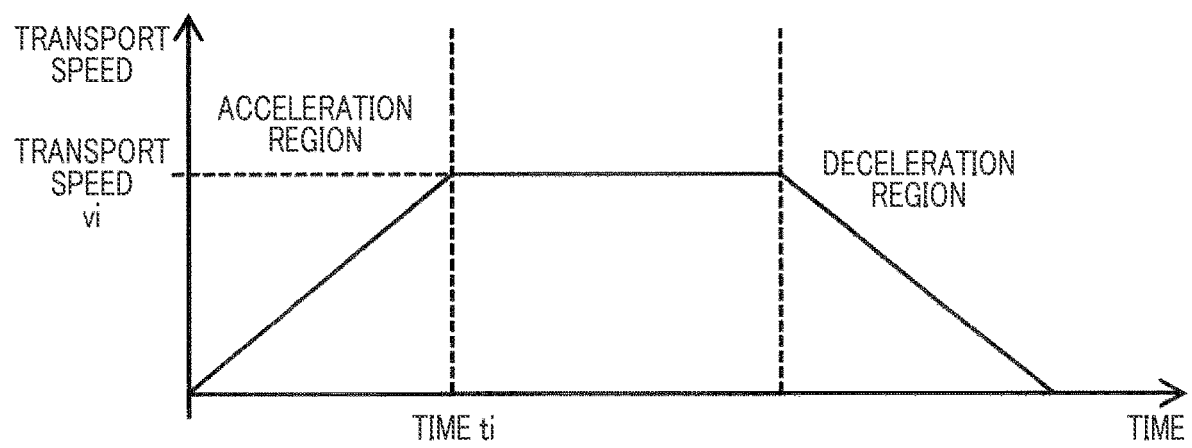

FIG. 3 is an explanatory graph schematically explaining by a graph, when a transport container is transported by a predetermined current such as a constant current for example in the transport apparatus 1 described in First Embodiment, a relationship between a time and a position of the transport container and a relationship between a time and transport speed of the transport container.

A drawing in the upper stage in FIG. 3 shows a relationship between a time and a position of the transport container, and a drawing in the lower stage in FIG. 3 shows a relationship between a time and transport speed of the transport container.

When the permanent magnet 10 moves a predetermined interval, there exist an acceleration region and a deceleration region in the predetermined interval.

In order to calculate transport speed of the transport container, it is preferable to use a distance between plural numbers of magnetic poles 25. Transport speed (average transport speed) of the transport container can be calculated using, for example, the distance from the magnetic pole 25 of X2Y2 to the magnetic pole 25 of X5Y2 and the time required between these magnetic poles 25 (the time for moving between these magnetic poles 25: transport time).

Particularly, it is preferable to use a time required between the magnetic poles 25 in the acceleration region and the distance between the magnetic poles 25, and it is also possible to calculate transport speed (average transport speed) of the transport container and to detect an abnormality of the transport apparatus 1 and the transport container.

Next, a section of the transport apparatus 1 described in First Embodiment will be schematically explained in time series.

Figure 4:
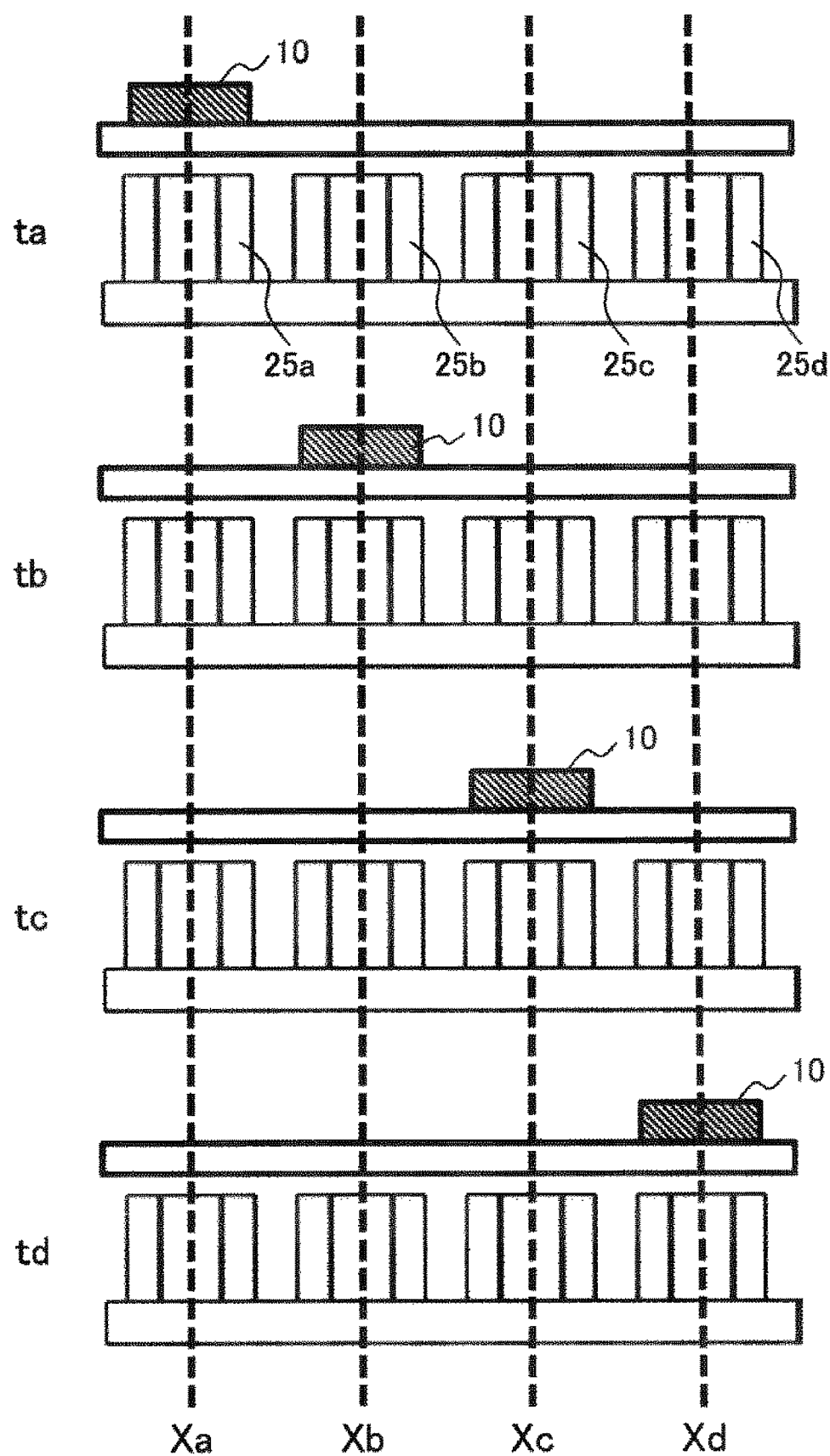
FIG. 4 is an explanatory view schematically illustrating, in time series, a section of the transport apparatus 1 described in First Embodiment.

FIG. 4 is an explanatory view schematically illustrating, in time series, a section of the transport apparatus 1 described in First Embodiment.

In the transport apparatus 1 described in First Embodiment, the permanent magnet 10 moves relatively to four magnetic poles of a magnetic pole 25*a*, a magnetic pole 25*b*, a magnetic pole 25*c*, and a magnetic pole 25*d* for example. For example, the magnetic pole 25*a* is disposed at the position of X2Y2 (position Xa, time ta), the magnetic pole 25*b* is disposed at the position of X3Y2 (position Xb, time tb), the magnetic pole 25*c* is disposed at the position of X4Y2 (position Xc, time tc), and the magnetic pole 25*d* is disposed at the position of X5Y2 (position Xd, time td), and the permanent magnet 10 moves from X2Y2 to X5Y2.

That is to say, a voltage is applied to a coil 21*a*, a coil 21*b*, a coil 21*c*, and a coil 21*d* in this order, the magnetic pole 25*a*, the magnetic pole 25*b*, the magnetic pole 25*c*, and the magnetic pole 25*d* are magnetized sequentially to impart a thrust (a force in the transport direction) to the permanent magnet 10, and the permanent magnet 10 is moved to the position Xa, the position Xb, the position Xc, and the position Xd in this order.

Also, each magnetic pole 25 includes the position detector 30.

The position detector 30 transmits information showing that the permanent magnet 10 has reached each position to the calculation unit 40, and the calculation unit 40 records a time at which the permanent magnet 10 reaches each position. The information transmitted by the position detector 30 may be logical information showing presence/absence of position detection, and may also be physical information such as a coil current and a voltage between shunt resistances.

That is to say, when the permanent magnet 10 reaches the position Xa, a position detector 30*a* transmits information showing an event of reaching to the calculation unit 40, and the calculation unit 40 records the time to at which the permanent magnet 10 reaches the position Xa. Similarly, when the permanent magnet 10 reaches the position Xb, a position detector 30*b* transmits information showing an event of reaching to the calculation unit 40, and the calculation unit 40 records the time tb at which the permanent magnet 10 reaches the position Xb. Similarly, when the permanent magnet 10 reaches the position Xc, a position detector 30*c* transmits information showing an event of reaching to the calculation unit 40, and the calculation unit 40 records the time tc at which the permanent magnet 10 reaches the position Xc. Similarly, when the permanent magnet 10 reaches the position Xd, a position detector 30*d* transmits information showing an event of reaching to the calculation unit 40, and the calculation unit 40 records the time td at which the permanent magnet 10 reaches the position Xd.

That is to say, the position detector 30 is disposed at each magnetic pole 25, the position detector 30 transmits information showing that the permanent magnet (magnetic body) 10 has passed through or has reached the magnetic pole 25 to the calculation unit 40, and the calculation unit 40 records the position of the magnetic pole 25 and the time. Also, the calculation unit 40 calculates transport speed of the transport container based on the position and the time.

Further, the start point of the time (time ta) may be made timing of the command in starting (point of origin) for example. That is to say, the time ta corresponding to the position Xa is made the point of origin, and the time corresponding to the position Xb, the position Xc, and the position Xd can be made the time tb, the time tc, and the time td respectively.

On a conceptual basis, it is possible to acquire time series data {t1, t2, ..., ti, ..., tN} of the time at which the transport container (the permanent magnet 10) passes through each magnetic pole 25 of N pieces from the position detector 30 included in each magnetic pole 25. Also ti is time at which the transport container (the permanent magnet 10) passes through the i-th magnetic pole 25.

Here, the position of the i-th magnetic pole is made Xi. The pitch dXi between the i-th and (i+1)-th magnetic poles is made dXi=X(i+1)−Xi.

Also, difference of the time at which the transport container (the permanent magnet 10) passes through the magnetic pole (i+1) and the magnetic pole i (transport time) dti becomes dti=t(i+1)−ti.

Accordingly, the transport speed vi of the transport container at the position Xi of the magnetic pole becomes vi=dXi/dti.

Next, explanation will be schematically given by a graph with respect to a relationship between a position Xi of a magnetic pole and transport speed vi of a transport container when the transport container is transported by a predetermined current such as a constant current for example in the transport apparatus 1 described in First Embodiment.

Figure 5:
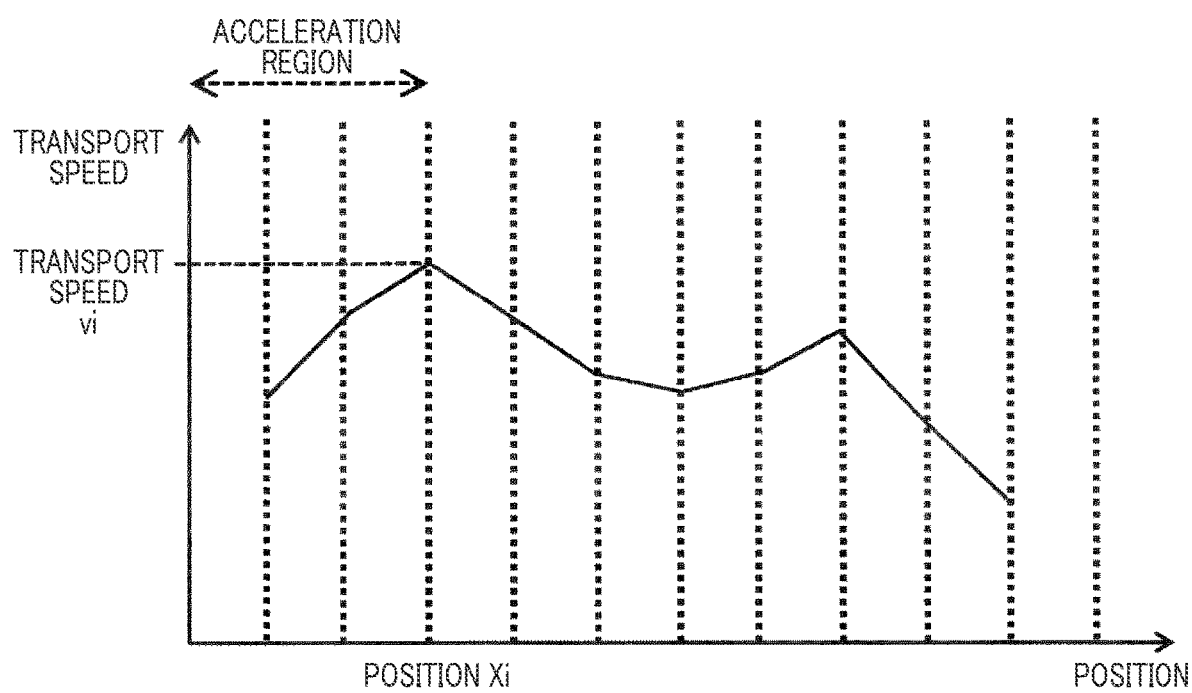
FIG. 5 is an explanatory graph schematically showing, when the transport container is transported by a constant current in the transport apparatus 1 described in First Embodiment, a relationship between a position Xi of a magnetic pole and transport speed vi of the transport container.

FIG. 5 is an explanatory graph schematically showing, when the transport container is transported by a predetermined current such as a constant current for example in the transport apparatus 1 described in First Embodiment, a relationship between a position Xi of a magnetic pole and transport speed vi of the transport container.

When the transport container is transported by a constant current, it is known that the transport speed vi of the transport container differs in the position Xi of each magnetic pole. That is to say, when the permanent magnet 10 moves from a position of a certain magnetic pole 25 to a position of the next magnetic pole 25 (not necessarily be required to be an adjacent magnetic pole 25), it is known that the transport container is transported repeating an acceleration region and a deceleration region and having acceleration ai at the position Xi of the magnetic pole.

Since the acceleration ai is a difference value (differential value) of transport speed vi of the transport container, it is liable to be affected by a noise and the like, and the error is liable to increase.

Therefore, it is preferable to calculate an average transport speed and average acceleration in a predetermined interval (from a position X1 of a magnetic pole to a position XN of a magnetic pole) for example. According to First Embodiment, average acceleration in a predetermined interval (from a position X1 of a magnetic pole to a position XN of a magnetic pole) is particularly made (vN−v1)/(tN−t1).

That is to say, according to First Embodiment, the calculation unit 40 calculates an average transport speed and average acceleration in a predetermined interval, and detects an abnormality of the transport apparatus 1 and the transport container based on the average transport speed and the average acceleration. Particularly, the calculation unit 40 calculates average acceleration in a predetermined interval, and detects a surface state of the transport plane based on the average acceleration.

Also, when a transport container is transported by a constant current for example, in a predetermined interval (a predetermined interval of a portion of plural numbers of the magnetic pole 25), if thrust of a transport container is substantially constant in average, from Newton's equation of motion, average acceleration (vN−v1)/(tN−t1) of the predetermined interval (from a position X1 of a magnetic pole to a position XN of a magnetic pole) becomes proportional to a value (F÷m) obtained by dividing a force F applied to the transport container by a mass m of the transport container.

Thus, by evaluating transport speed of a transport container (a distance between magnetic poles 25 (a position of the magnetic pole 25) and transport time between magnetic poles 25 (time of the magnetic pole 25)), information on a force F applied to the transport container and a mass m of the transport container can be also acquired.

As described above, the transport apparatus 1 described in First Embodiment includes: a transport plane on which a transport container including the permanent magnet 10 is transported; the position detector 30 that detects a position of the transport container (the permanent magnet 10) on the transport plane; the magnetic pole 25 that is arranged under the transport plane and includes the core 22 and the coil 21; the drive unit 50 that applies a voltage to the magnetic pole 25 (the coil 21); and the calculation unit 40 that controls the drive unit 50, in which the calculation unit 40 calculates transport speed of the transport container (the permanent magnet 10) based on a position of the transport container on the transport plane and a time at which the transport container passes through the position, and detects a surface state of the transport plane and/or a state of the transport container based on the calculated transport speed of the transport container.

Thus, the transport apparatus 1 described in First Embodiment can detect an abnormality of the transport apparatus 1 and the transport container caused by a change in a state of the transport apparatus 1 and the transport container and can maintain high transport performance.

As described above, according to First Embodiment, by using transport speed of a transport container and detecting a surface state of a transport plane and a state of the transport container, a surface state of a transport plane and a state of the transport container can be detected quickly.

Second Embodiment

Next, explanation will be given schematically on a transport route of a transport container that is transported on a transport plane in the transport apparatus 1 described in Second Embodiment.

Figure 6:
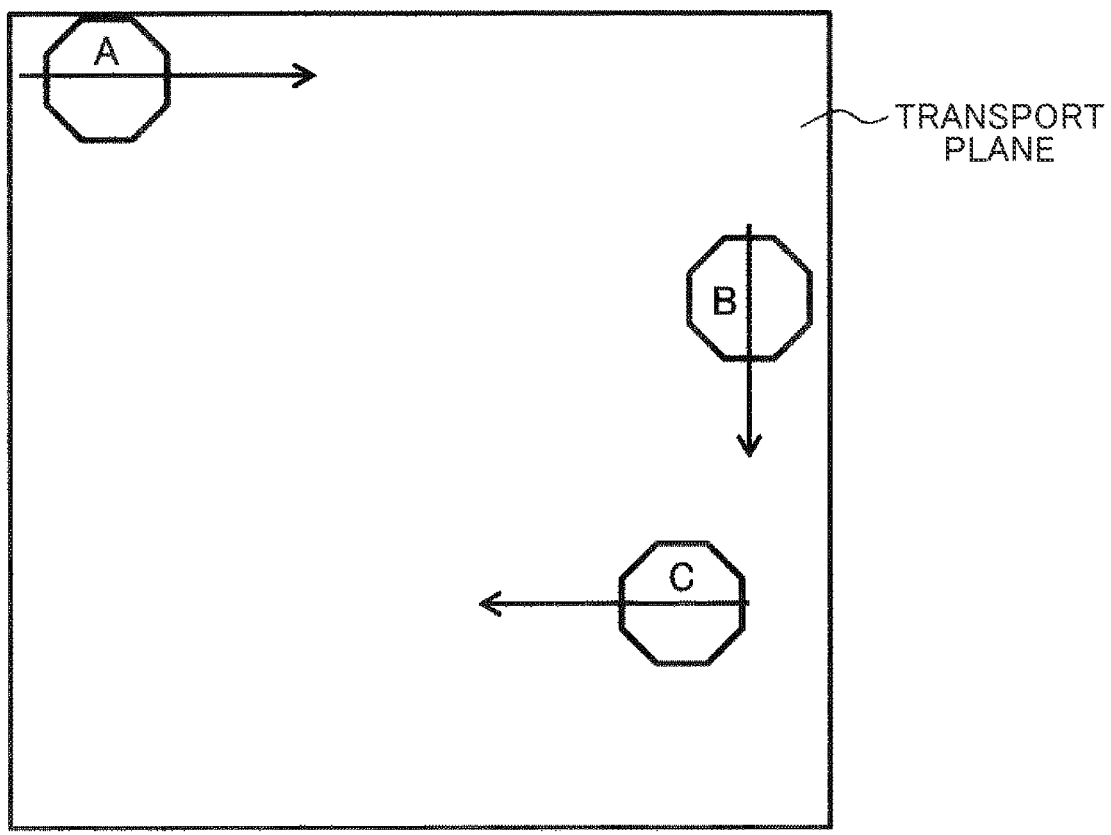
FIG. 6 is an explanatory view schematically illustrating a transport route of a transport container that is transported on a transport plane, in a transport apparatus 1 described in Second Embodiment.

FIG. 6 is an explanatory view schematically illustrating a transport route of a transport container that is transported on a transport plane in the transport apparatus 1 described in Second Embodiment.

In a force applied to a transport container, a friction force between a transport plane and a transport surface of the transport container reflects the surface state of the transport plane, and differs according to the location on the transport plane.

Therefore, by comparing the average transport speed of a point A, a point B, and a point C on the transport plane for example, dependability by a location on the surface of the transport plane can be detected.

That is to say, detection of dependability by a location on the surface of the transport plane is performed by moving a transport container to be inspected on the transport plane (a predetermined motion mode). At this time, it is preferable to be performed at each point on the transport plane in sequence along sides of the transport plane. This is similar also in a case of grasping reference transport speed of a transport container. That is to say, transport speed of a transport container comes to be calculated at each point on the transport plane.

That is to say, when the mass and the shape of the transport container differ, even when the transport route is same, the transport speed of the transport container changes. Therefore, according to Second Embodiment, dependability by a location on the surface of the transport plane is detected using a transport container for inspection having a reference mass (identical shape) of the transport container.

Further, also in a case a magnetic force of the permanent magnet 10 and a state of the transport surface of the transport container are different, even when the transport route is same, transport speed of the transport container changes. Therefore, according to Second Embodiment, dependability by a location on the surface of the transport plane is detected using a transport container for inspection in which a reference magnetic force of the permanent magnet 10 and a reference state of the transport surface of the transport container are grasped.

That is to say, the transport container for inspection is one having a reference mass (identical shape) of the transport container in which a reference magnetic force of the permanent magnet 10 and a reference state of the transport surface of the transport container are grasped.

As described above, according to Second Embodiment, a reference magnetic force of the permanent magnet 10, a reference state of the transport surface of the transport container, and a reference surface state of the transport plane are grasped with a reference mass (identical shape) of the transport container, and reference transport speed of the transport container is grasped beforehand.

Also, transport speed of the transport container grasped (reference transport speed of the transport container) and transport speed of the transport container calculated at each point on the transport plane using a transport container for inspection are compared, and, when difference of the transport speed does not fall into a predetermined range, it is detected there is an abnormality in the transport apparatus (transport plane for example) 1. Thus, dependability by a location on the surface of the transport plane can be detected.

Further, when a mass and a shape of the transport container, a magnetic force of the permanent magnet 10, and a state of the transport surface of the transport container are unknown namely when a reference transport container for inspection cannot be used, a transport container to be inspected is moved on the transport plane, and transport speed of the transport container is calculated at each point on the transport plane. Also, using different plural numbers of the transport container, transport speed of the transport container is calculated respectively. Further, the transport speed of the transport container is standardized to a relative value using a typical value (an average value and a median value for example) on the transport plane, and dependability by a location on the surface of the transport plane is detected.

Also, when a mass of the transport container is unknown particularly, by using a difference in a mass of different plural numbers of the transport container described below (refer to Fourth Embodiment), the transport speed of the transport container can be standardized to a relative value using a mass of the different plural numbers of the transport container, and dependability by a location on the surface of the transport plane can be detected also.

As described above, the transport apparatus 1 described in Second Embodiment is characterized particularly that a transport container for inspection capable of grasping beforehand a mass and a shape of the transport container, a magnetic force of the permanent magnet 10, a state of the transport surface of the transport container, and a surface state of the transport plane is used, and that the calculation unit 40 calculates transport speed of the transport container based on a position on the transport plane of the transport container (the permanent magnet 10) and a time of passing through the position and detects a surface state of the transport plane based on the transport speed of the transport container calculated.

That is to say, detection of a surface state of the transport plane is performed using a transport container of a constant mass, an identical shape, a reference magnetic force of the permanent magnet (magnetic body) 10 (a new transport container or a transport container in which a magnetic force of the permanent magnet (magnetic body) 10 could be grasped), and a reference state of the transport surface (a new transport container or a transport container in which a state of the transport surface could be grasped).

Thus, the transport apparatus 1 described in Second Embodiment can detect an abnormality of the transport apparatus 1 caused by a change in a surface state of the transport plane of the transport apparatus 1 and can maintain high transport performance.

As described above, according to Second Embodiment, by using transport speed of a transport container and detecting a surface state of a transport plane, a surface state of a transport plane can be detected quickly.

Third Embodiment

Next, explanation will be given, in time series, on a current value for each position of a magnetic pole in the transport apparatus 1 described in Third Embodiment.

FIG. 7 is an explanatory table showing, in time series, a current value for each position of a magnetic pole in the transport apparatus 1 described in Third Embodiment.

The transport apparatus 1 described in Third Embodiment acquires information on a surface state of a transport plane equivalent to a static friction coefficient (a friction force between a transport plane and a transport surface of a transport container) on a transport plane from a position, current, voltage, and time when the permanent magnet 10 starts to move on the transport plane.

The transport apparatus 1 described in Third Embodiment detects a current (current value) flowing through the magnetic pole 25 (the coil 21) from the drive unit 50 or the position detector 30 and the like for example. Also, a current of each predetermined time (date and time) (in time series) is acquired. That is to say, the current of the position Xa of the magnetic pole, the position Xb of the magnetic pole, the position Xc of the magnetic pole, and the position Xd of the magnetic pole corresponding to the predetermined time is acquired.

The transport container (the permanent magnet 10) to be detected is moved in a predetermined motion mode in order to evaluate the static friction coefficient.

To be more specific, such case is assumed for example that the permanent magnet 10 is positioned above (right above) one (magnetic pole position Xa) of two magnetic poles 25 (magnetic pole position Xa and magnetic pole position Xb for example). When a voltage is applied to the magnetic pole 25 (magnetic pole position Xb), the permanent magnet 10 not being positioned above (right above) the magnetic pole position Xb, in the permanent magnet 10, a force of being drawn to the magnetic pole 25 (magnetic pole position Xb) is generated, and a force (thrust) to the transport direction is generated.

In a case of a date and time (1) and a date and time (2), a current value of the magnetic pole position Xa (0.50 A–0.51 A) and a current value of the magnetic pole position Xb (0.48 A–0.19 A) are acquired, and there is generally no change in the current value (0.48 A–0.51 A). Therefore, it is known that the permanent magnet 10 moves from the magnetic pole position Xa to the magnetic pole position Xb by a generally constant current.

On the other hand, in a case of a date and time (3) and a date and time (4), a current value of the magnetic pole position Xa (0.50 A–0.49 A) and a current value of the magnetic pole position Xb (0.90 A–0.91 A) are acquired, and it is known that the current detected from the magnetic pole position Xb is larger than the current detected from the magnetic pole position Xa.

This is estimated to show that, even when a force drawn to the magnetic pole 25 of the magnetic pole position Xb generated in the permanent magnet 10 when the magnetic pole 25 of the magnetic pole position Xb is magnetized by a constant current does not change, a static friction force applied to the permanent magnet 10 increases which results in a small force (thrust) in the transport direction.

Therefore, according to Third Embodiment, a current for magnetizing the magnetic pole 25 of the magnetic pole position Xb is gradually increased, and a current for moving the permanent magnet 10 is acquired.

As described above, when the current value of the magnetic pole position Xb increases from the date and time (3) and the current value exceeds a predetermined threshold, by calling attention by an alert or by displaying on a monitoring system, a user or a system manager can be notified quickly of a change in a surface state of a transport plane. That is to say, this monitoring system includes a display device (a user interface), and displays a change in a surface state of the transport plane.

Also, based on a current value of a case the permanent magnet 10 moves to an adjacent magnetic pole position, a static friction coefficient of a transport plane and a transport surface of a transport container can be evaluated.

Further, although explanation will be given using a current value according to Third Embodiment, a DC current value of the magnetizing current may be used instead of the current value. Also, when the permanent magnet 10 is moved by a voltage pulse, instead of the current value, a current effective value, a current instantaneous value, a duty of a voltage pulse, and the like may be used.

Further, for example, instead of applying a constant voltage to the magnetic pole 25 of the magnetic pole position Xb and gradually increasing the voltage applied to the magnetic pole 25 of the magnetic pole position Xb, it is also possible to allow a current to flow through the magnetic pole 25 of the magnetic pole position Xa (the magnetic pole 25 right below the permanent magnet 10) so that a repulsion force of the permanent magnet 10 against the magnetic pole 25 of the magnetic pole position Xa is generated.

Also, by using the transport container for inspection (the permanent magnet 10), a surface state of the transport plane particularly can be evaluated. Further, by using the transport container for inspection, influence of individual difference of the transport container can be suppressed.

With respect to the transport container for inspection, a mass and a shape of the reference transport container and a reference magnetic force of the permanent magnet 10 and a reference state of the transport surface of the transport container are grasped. Also, the reference transport container is a new transport container having a predetermined shape and in a state of not including a sample for example.

Further, when a mass and a shape of the transport container, a magnetic force of the permanent magnet 10, and a state of the transport surface of the transport container have been grasped beforehand, by standardizing such mass and shape of the transport container, a magnetic force of the permanent magnet 10, and a state of the transport surface of the transport container, a transport container of a different kind can be evaluated.

As described above, the transport apparatus 1 described in Third Embodiment detects a current flowing through the magnetic pole 25 of the time when the permanent magnet 10 passes through the magnetic pole 25 by the drive unit 50 and estimates the surface state of the transport plane. By acquiring a current flowing through the magnetic pole 25 and evaluating a static friction coefficient, an abnormality of the transport apparatus 1 caused by a change in the surface state of the transport plane of the transport apparatus 1 can be detected, and high transport performance can be maintained.

Fourth Embodiment

Next, explanation will be given schematically in a graph on a relationship between a position Xi of a magnetic pole (horizontal axis) and transport speed vi of the transport container (vertical axis) in a case when a transport container is transported by a predetermined current such as a constant current for example in the transport apparatus 1 described in Fourth Embodiment.

Figure 8:
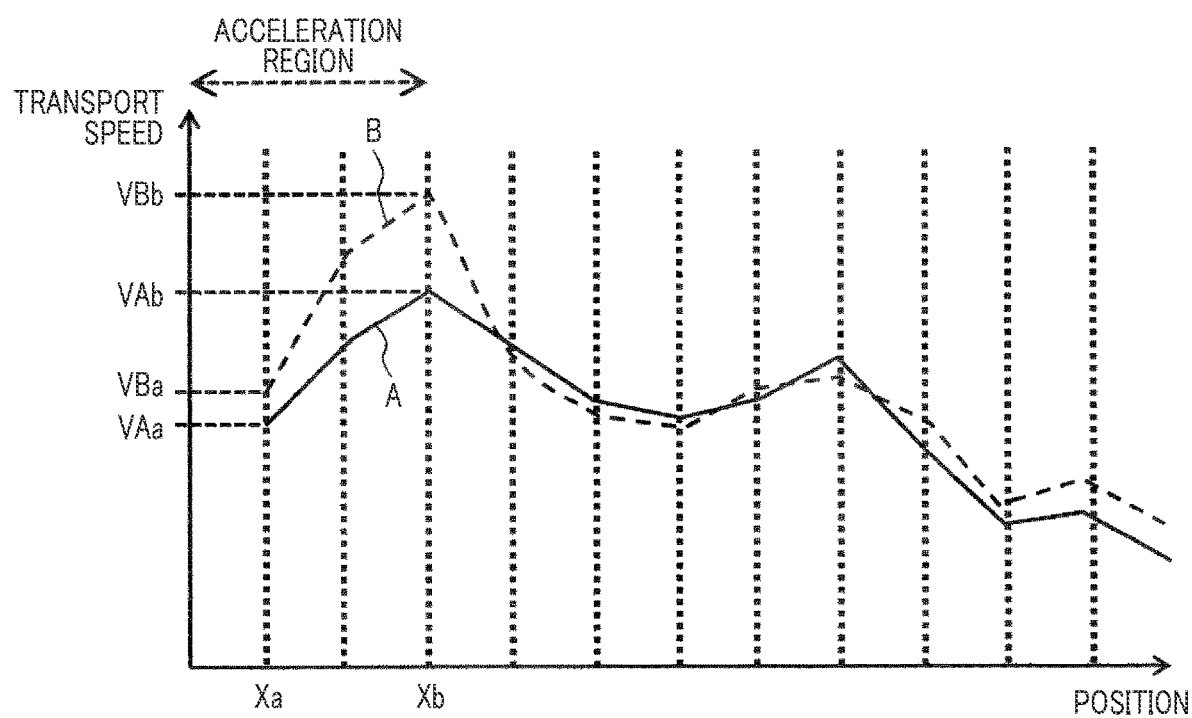
FIG. 8 is an explanatory graph schematically showing, when a transport container is transported by a constant current in a transport apparatus 1 described in Fourth Embodiment, a relationship between a position Xi of a magnetic pole and transport speed vi of the transport container.

FIG. 8 is an explanatory graph schematically showing, when a transport container is transported by a predetermined current such as a constant current for example in the transport apparatus 1 described in Fourth Embodiment, a relationship between a position Xi of a magnetic pole and transport speed vi of the transport container.

According to the present embodiment, in a same transport position or a same transport route, using an acceleration region of transport speed of a transport container, average acceleration of different plural numbers of transport container is evaluated, and a mass of the different plural numbers of transport container (ratio) is estimated.

In concrete terms, when a transport container is to be transported by a predetermined current such as a constant current for example, in a case an electromagnetic force out of a force F applied to the transport container is large, a friction force can be ignored relatively with respect to the electromagnetic force, and the permanent magnet 10 is generally same, average acceleration of a transport container (transport speed of transport container Vi/time ti) is inversely proportional to a mass of the transport container. Thus, based on the average acceleration of a transport container, a mass of different plural numbers of transport container can be estimated.

For example, as shown in FIG. 8, passing time of a transport container A at the position Xa of the transport container A is made tAa and transport speed is made VAa, passing time of the transport container A at the position Xb of the transport container A is made tAb and transport speed is made VAb, passing time of a transport container B at the position Xa of the transport container B is made tBa and transport speed is made VBa, and passing time of the transport container B at the position Xb of the transport container B is made tBb and transport speed is made VBb.

Average acceleration aA in an acceleration region of the transport container A becomes (VAb−VAa)/(tAb−tAa), and average acceleration aB in an acceleration region of the transport container B becomes (VBb−VBa)/(tBb−tBa). That is to say, between two different transport container A and transport container B, difference of transport speed of a transport container (VAb−VAa)/(tAb−tAa) and (VBb−VBa)/(tBb−tBa) differ from each other.

That is to say, when a transport container is to be transported by a predetermined current such as a constant current for example and in a case of using a transport container in which a shape of the transport container, a magnetic force of the permanent magnet 10, and a state of a transport surface of the transport container are grasped and in a case a surface state of the transport plane is grasped, based on the difference of transport speed of the transport container, difference in mass (ratio) of two different transport container A and transport container B can be estimated.

Also, according to Fourth Embodiment, an acceleration region of transport speed of a transport container is used. The reason of doing so is that difference of the transport speed of two different transport container A and transport container B appears significantly. In a region other than the acceleration region, by speed control of the transport container, difference of the transport speed of the transport container becomes small.

As described above, according to the transport apparatus 1 described in Fourth Embodiment, the calculation unit 40 estimates the difference in a mass of plural numbers (two pieces in Fourth Embodiment) of different transport container based on a position on the transport plane of the transport container (the permanent magnet 10) and transport speed of the transport container. Thus, the difference in a mass of plural numbers of different transport container can be estimated, and highly reliable detection of an abnormality of the transport apparatus 1 can be achieved.

That is to say, the calculation unit 40 estimates the mass of plural numbers of different transport container based on the average acceleration (average transport speed) in a predetermined interval of the plural numbers of different transport container. Also, this predetermined interval is an acceleration region where the transport container accelerates.

Further, based on the difference in the mass of the plural numbers of different transport container, the position of the transport container, and the transport speed of the transport container, more highly reliable estimation of the surface state of the transport plane can be achieved.

Fifth Embodiment

Next, explanation will be given on a schematic configuration of the calculation unit 40 in the transport apparatus 1 described in Fifth Embodiment.

Figure 9:
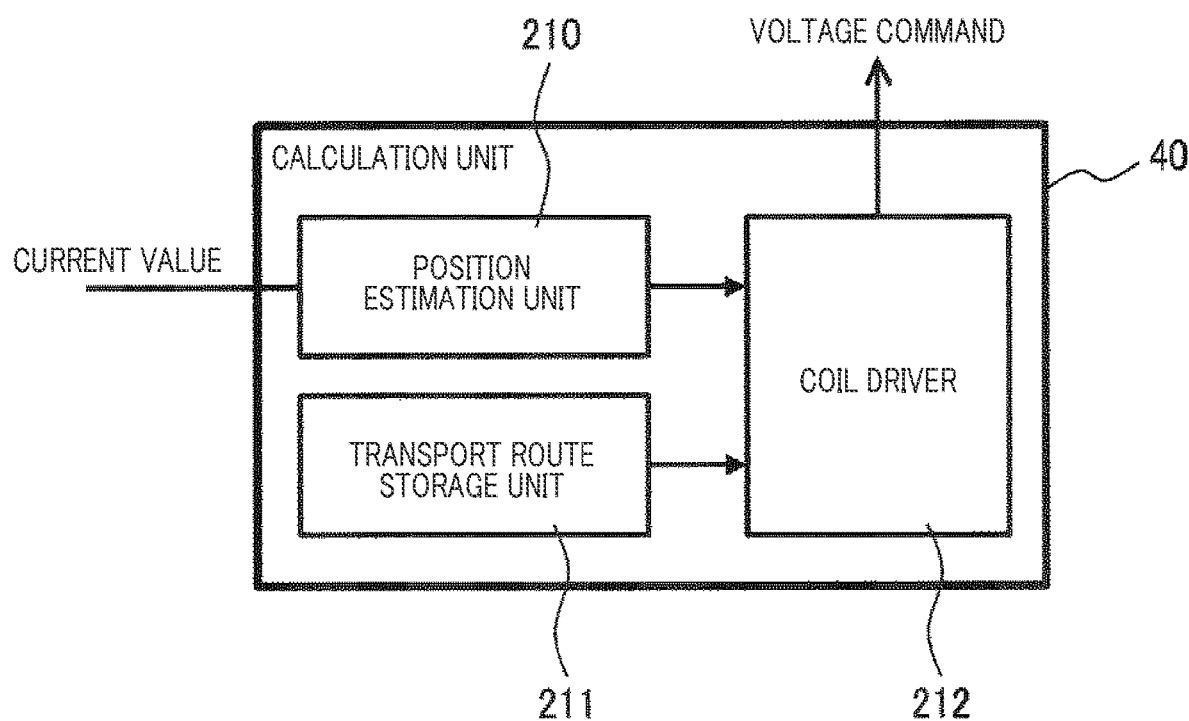
FIG. 9 is an explanatory view illustrating a schematic configuration of a calculation unit 40 of a transport apparatus 1 described in Fifth Embodiment.

FIG. 9 is an explanatory view illustrating a schematic configuration of the calculation unit 40 of the transport apparatus 1 described in Fifth Embodiment.

The transport apparatus 1 described in Fifth Embodiment includes a current detector detecting a current, and detects the position of the transport container based on the current detected by the current detector. That is to say, by detecting the current (a change amount of the current of rise/fall of the position detection pulse) detected by the current detector, the position of the transport container is detected.

The calculation unit 40 processes a control signal that is for magnetizing the magnetic pole 25 for moving the transport container and a signal that is for detecting an event that the transport container passes through the position of the magnetic pole 25.

The calculation unit 40 includes a position estimation unit 210 estimating the position of the magnetic pole 25 where the permanent magnet 10 passes through, a transport route storage unit 211 storing a transport route of the transport container, and a coil driver 212 controlling the voltage pulse applied to the magnetic pole 25 for moving the transport container.

The position estimation unit 210 estimates the position of the transport container based on a current outputted from a motor driver, and outputs the estimated position of the transport container to the coil driver 212.

The coil driver 212 applies a voltage pulse to the magnetic pole 25 located in the transport direction based on the estimated position of the transport container and the transport route of the transport container stored in the transport route storage unit 211. Also, as a voltage command, the coil driver 212 calculates the magnetic pole 25 to which a voltage pulse applied to the magnetic pole 25 for moving the transport container and a voltage pulse detecting the position of the magnetic pole 25 where the transport container passes through are to be applied.

Next, explanation will be given on both of a voltage waveform applied to a coil to detect a position of a transport container and a corresponding current waveform in the transport apparatus 1 described in Fifth Embodiment.

Figure 10:
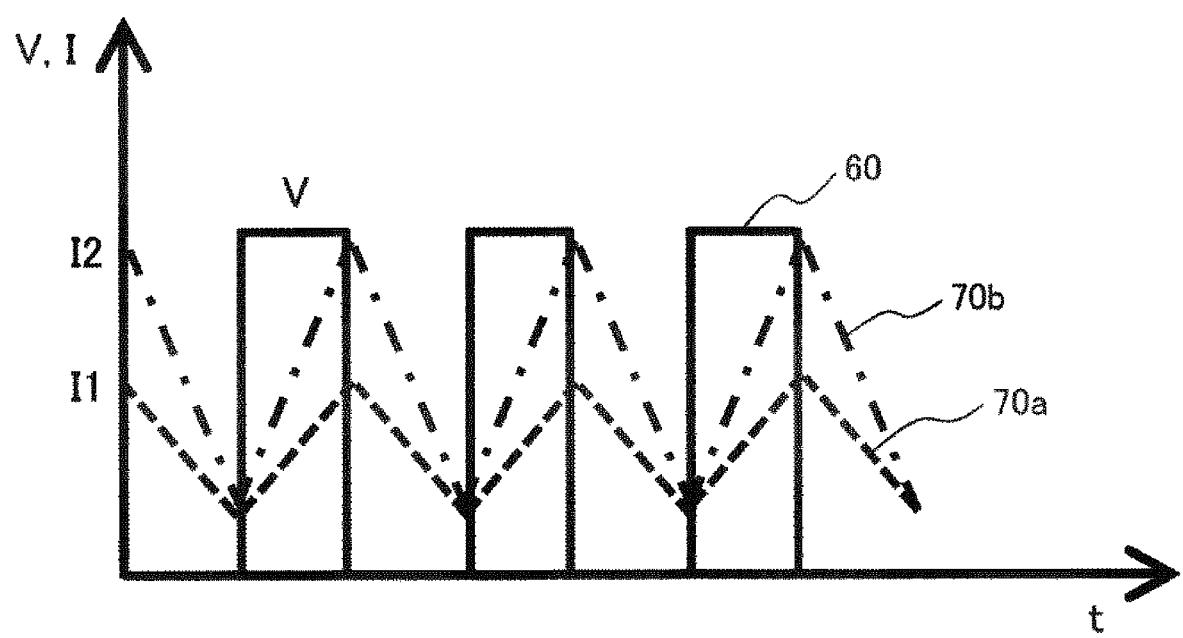
FIG. 10 is an explanatory graph showing both a voltage waveform applied to a coil to detect a position of a transport container and a corresponding current waveform, in the transport apparatus 1 described in Fifth Embodiment.

FIG. 10 is an explanatory graph showing both of a voltage waveform applied to a coil to detect a position of a transport container and a corresponding current waveform in the transport apparatus 1 described in Fifth Embodiment.

The magnitude of a voltage pulse 60 (V) and the pulse width (t) are determined by which degree of the voltage is to be applied to the magnetic pole 25. Also, when the permanent magnet 10 of the transport container approaches the magnetic pole 25, by magnetism saturation of the magnetic pole 25, the current waveform changes from 70a to 70b.

Thus, the transport apparatus 1 described in Fifth Embodiment includes a transport plane transporting a transport container on the transport plane, the transport container including the permanent magnet (magnetic body) 10, the magnetic pole 25 arranged below the transport plane and including the core 22 and the coil 21, the drive unit 50 applying a voltage (particularly a voltage pulse) to the magnetic pole 25, and the calculation unit 40 controlling the drive unit 50.

Also, the drive unit 50 detects a current (particularly a current waveform) flowing through the magnetic pole 25. The calculation unit 40 detects the position on the transport plane of the transport container based on the detected current, calculates the transport speed of the transport container based on the position on the transport plane of the transport container and the time at which the transport container passes through the position, and detects the surface state of the transport plane based on the calculated transport speed of the transport container.

Further, the drive unit 50 detects the current flowing through a resistance that is connected to a coil of the magnetic pole 25.

Also, it is preferable that detection of the surface state of the transport plane is performed using a transport container for inspection.

That is to say, since a current (particularly a current waveform) changes according to a position of a transport container, the position of the transport container can be estimated using the change of the current. For example, the position of the transport container can be estimated while transporting the transport container by detecting a change amount of the current of the rise/fall of the position detection pulse of the current waveform 70*a* and the current waveform 70*b*.

As described above, according to Fifth Embodiment, the position of the transport container can be estimated without arranging the position detector 30 in the magnetic pole 25. Also, the transport speed of the transport container can be calculated based on the position on the transport plane of the transport container and the time at which the transport container passes through the position, and the surface state of the transport plane can be detected based on the calculated transport speed of the transport container.

Sixth Embodiment

Next, using a transport container in which the mass and shape of the transport container, the magnetic force of the permanent magnet 10, and the state of the transport surface of the transport container are known, it is detected that the transport apparatus (the transport plane for example) 1 has an abnormality.

That is to say, transport speed of a transport container having a known mass of the transport container (known shape), a known magnetic force of the permanent magnet 10, in a known state of the transport surface of the transport container, and in a known surface state of the transport plane (known transport speed of the transport container) is grasped beforehand, and the grasped transport speed of the transport container (known transport speed of the transport container) and calculated transport speed of the transport container are compared to each other. When difference of the transport speed does not fall into a predetermined range, it is detected that the transport apparatus (the transport plane for example) 1 has an abnormality.

Here, with respect to the calculated transport speed of the transport container, there are two cases for example of (1) a case that a known transport container is used, and the known transport container is moved on the transport plane for calculation, and (2) a case that a transport plane having a known surface state of the transport plane is used, and a transport container to be inspected is moved on this transport plane for calculation.

Also, by using a known transport container, moving beforehand the known transport container on a transport plane to be inspected, and collecting and using as a reference value a position, current, voltage, and time of the time when the known transport container moves on the transport plane, the surface state of the transport plane can be evaluated as an absolute value.

Further, the reference value may be set by a vendor beforehand, and may be set by a user or a system manager using a calibration mode.

Also, by using plural numbers of the transport container for inspection, the speed of a process for detecting an abnormality can be increased.

Further, the known transport container is a transport container having a predetermined shape, in a state of not including a sample, and with a known mass for example. Also, the known transport speed of the transport container is transport speed of a transport container using such known transport container and in a known surface state of the transport plane.

Thus, the transport apparatus 1 described in Sixth Embodiment can detect an abnormality of the transport apparatus 1 caused by a change in the surface state of the transport plane of the transport apparatus 1, and can maintain high transport performance. As described above, according to Sixth Embodiment, by using transport speed of a transport container and detecting a surface state of a transport plane, a surface state of a transport plane can be detected quickly.

Seventh Embodiment

Next, explanation will be given on a schematic configuration of a system that performs monitoring of a surface state of a transport plane, the mass of a transport container, and the like by collecting transport information (position, voltage and current, transport time, etc.) on a transport container in the transport apparatus 1 described in Seventh Embodiment.

Figure 11:
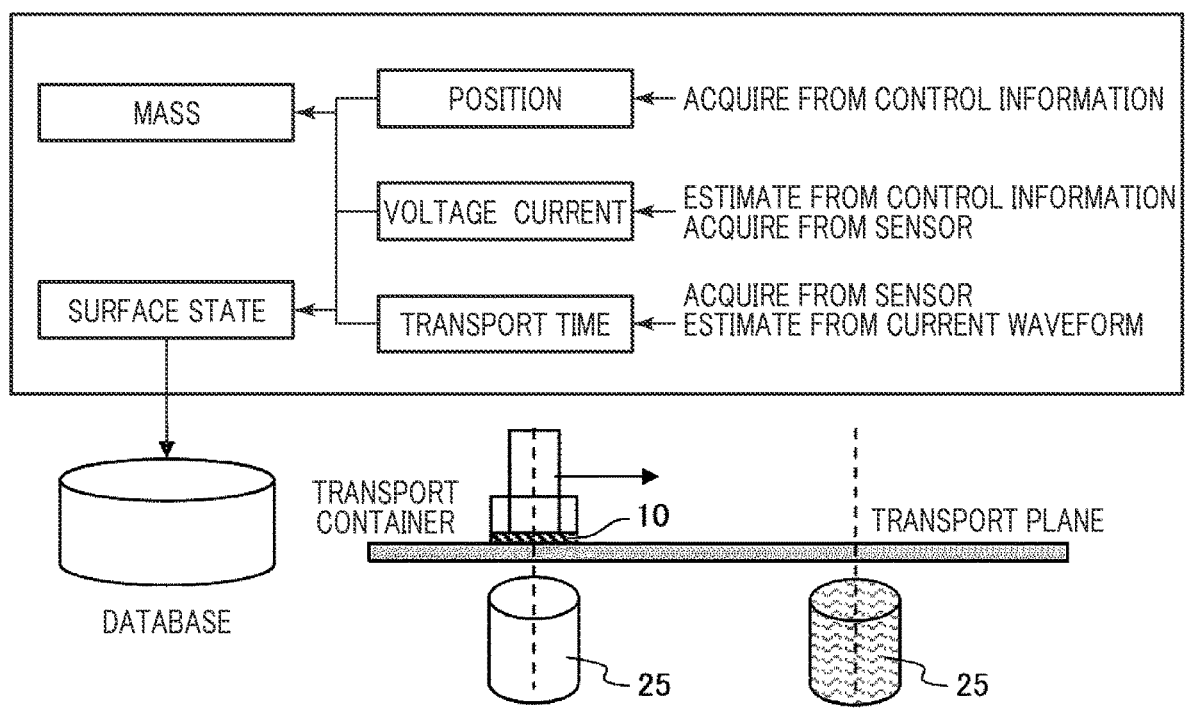
FIG. 11 is an explanatory view illustrating a schematic configuration of a system that performs monitoring of a surface state of a transport plane, the mass of a transport container, and the like by collecting transport information (position, voltage and current, transport time, etc.) on a transport container, in a transport apparatus 1 described in Seventh Embodiment.

FIG. 11 is an explanatory view illustrating a schematic configuration of a system that performs monitoring of a surface state of a transport plane, the mass of a transport container, and the like by collecting transport information (position, voltage and current, transport time, etc.) on a transport container in the transport apparatus 1 described in Seventh Embodiment.

The transport apparatus 1 described in Seventh Embodiment is used as a sample analysis system with plural numbers of transport apparatus 1 being combined. While the sample analysis system is in operation, transport information (position, voltage and current, transport time, etc.) on a transport container is collected to a server from plural numbers of the transport apparatus 1, the server being for controlling the transport container.

Also, transport information (position, voltage and current, transport time, etc.) on a transport container is collected, and monitoring of the surface state of the transport plane, the mass of the transport container, and so on are performed.

That is to say, the position is acquired from the control information, or detected by the position detector 30 or by the current waveform corresponding to a voltage pulse, and so on. The voltage and the current are estimated from the control information, or acquired from a sensor of the voltage and current. The transport time (time) is acquired from a sensor, or estimated from the current waveform.

Thus, the surface state of the transport plane, the mass of the transport container, and so on are monitored, and a control defect caused by a change in the surface state of the transport plane and the mass of the transport container (increase of the surface roughness of the transport plane and the transport surface of the transport container, increase of the static friction coefficient, damage, attachment of dust, dirt and deterioration for example) can be detected quickly. Also, by calling attention by an alert or by displaying on a monitoring system, a user or a system manager can be notified quickly of a change in a surface state of a transport plane or in a mass of a transport container. Thus, a transport apparatus with high reliability can be provided.

Also, a server consolidates the transport information of these transport containers to a database existing in a data center such as a cloud, and utilizes the transport information for the sample analysis system.

That is to say, the current flowing through the magnetic pole 25, the voltage applied to the magnetic pole 25, the position on the transport plane of the transport container, the time at which the transport container passes through the position, the transport speed of the transport container, the surface state of the transport plane, the transport time, and so on are stored in the database. Also, it is preferable that they are transmitted to the database by a communication device having a communication function.

Also, the server acquires such dependability by a location on the surface of the transport plane as described in Second Embodiment. Further, the server acquires such information as described in Third Embodiment on a surface state of a transport plane equivalent to a static friction coefficient on a transport plane from a position, current, voltage, and time of the time when the permanent magnet 10 moves on the transport plane. Also, a current for each predetermined time flowing through the magnetic pole 25 is acquired particularly.

Thus, the surface state of the transport plane, the mass of the transport container, and so on can be monitored, and the control defect can be detected quickly and automatically while the sample analysis system is in operation.

Also, the present invention is not limited to the embodiments described above, and various modifications are included in the present invention. For example, the embodiments described above were explained concretely for easy understanding of the present invention, and the present invention is not necessarily limited to those including all configurations explained. Also, it is possible to replace a part of a configuration of an embodiment by a part of a configuration of another embodiment. Further, it is also possible to add a configuration of another embodiment to a configuration of an embodiment. Furthermore, with respect to a part of a configuration of each embodiment, it is also possible to effect addition, deletion, and replacement of a part of another configuration.

LIST OF REFERENCE SIGNS

1 Transport apparatus
10 Permanent magnet
21 Coil
22 Core
25, 25a, 25b, 25c, 25d Magnetic pole
30 Position detector
40 Calculation unit
50 Drive unit
60 Voltage pulse
70a, 70b Current waveform
210 Position estimation unit
211 Transport route storage unit
212 Coil driver

What is claimed is:

1. A transport apparatus comprising:
a plurality of transport containers, each transport container including a magnetic body;
a transport plane on which a plurality of transport containers are transported;
a position detector that detects respective positions of the transport containers on the transport plane;
a plurality of magnetic poles, which are arranged under the transport plane, each magnetic pole including a core and a coil;
a drive unit that applies a voltage to each magnetic pole; and
a calculation unit that controls the drive unit,
wherein the calculation unit is configured to:
calculate a transport speed of each transport container transported along a same route passing through a plurality of positions, based on the respective transport container passing through each position on the transport plane and a time at which the respective transport container passes through each position using an interval of time required for the respective transport container to move between ones of the plurality of magnetic poles in an acceleration region where the respective transport container accelerates from a first position to a second position, the transport speed being greatest at the second position among the positions the transport container passes through, and a distance between the magnetic poles in the acceleration region,
estimate a mass of each of the transport containers based on an average acceleration in the acceleration region of the transport containers,
compare the calculated transport speed of the respective transport containers and a reference transport speed of a reference transport container having a predetermined mass, and
detect a surface state of the transport plane based on a difference in the mass of the transport containers, and the respective comparisons of the transport speeds of the transport containers and the reference transport speed.

2. The transport apparatus according to claim 1,
wherein each position detector is arranged to transmit a time at which a magnetic body passes through or reaches the magnetic poles to the calculation unit.

3. The transport apparatus according to claim 1,
wherein the calculation unit records the positions of the magnetic poles and the time, and calculates the transport speeds of the transport containers based on the positions and the time.

4. The transport apparatus according to claim 1,
wherein a reference surface state of the transport plane is detected using the reference transport container, the reference transport container having a constant mass and a same shape and magnetic force of the magnetic bodies of the transport containers.

5. The transport apparatus according to claim 1,
further comprising a monitoring system that displays a change in the surface state of the transport plane.

6. A transport apparatus comprising:
a plurality of transport containers, each transport container having a magnetic body;
a transport plane on which the plurality of transport containers are transported;
a plurality of magnetic poles that are arranged under the transport plane, each magnetic pole including a core and a coil;
a drive unit that applies a voltage to the magnetic poles; and a calculation unit that controls the drive unit,
wherein the drive unit detects a current that flows through the magnetic poles, and
wherein the calculation unit is configured to:
detect respective positions of the transport containers on the transport plane based on the detected currents, calculate respective transport speeds of the transport containers transported along a same route passing through a plurality of positions, based on the respective transport passing through each position on the transport plane and a time at which the respective transport container passes through each position and using an interval of time required for the transport containers to move between ones of the plurality of magnetic poles in an acceleration region where the respective transport containers accelerate from a first position to a second position, the transport speed being greatest at the second position among positions the transport container passes through, and a distance between the magnetic poles in the acceleration region, estimate a mass of each of the transport containers based on an average acceleration in the acceleration region of the transport containers, compare the calculated transport speed of the respective transport containers and a reference transport speed of a reference transport container having a predetermined mass, and detect a surface state of the transport plane based on a difference in the mass of the transport containers, and the respective comparisons of the transport speeds of the transport containers and the reference transport speed.

7. The transport apparatus according to claim 6, wherein the drive unit detects a current that flows through a resistance connected to the coils.

8. The transport apparatus according to claim 6, wherein the voltage applied to the magnetic poles by the drive unit is a voltage pulse, and the current detected by the drive unit is a current waveform.

9. The transport apparatus according to claim 6, comprising a database that stores a current flowing through the magnetic poles, a voltage applied to the magnetic poles, respective positions of the transport containers on the transport plane, a time at which the transport containers pass through the respective positions, transport speeds of the transport containers, and a surface state of the transport plane.

10. The transport apparatus according claim 9, wherein the current flowing through the magnetic poles, the voltage applied to the magnetic poles, the respective positions of the transport containers on the transport plane, the time at which the transport containers pass through the respective positions, the transport speeds of the transport containers, and the surface state of the transport plane are transmitted to the database by a communication device.

\* \* \* \* \*